W. SYMMES & W. E. TRENT.
APPARATUS FOR PRECIPITATING VALUE BEARING SOLUTIONS.
APPLICATION FILED NOV. 9, 1911.
1,048,373.
Patented Dec. 24, 1912.
2 SHEETS—SHEET 2.
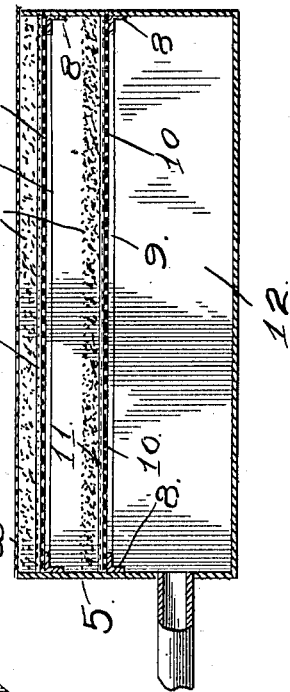
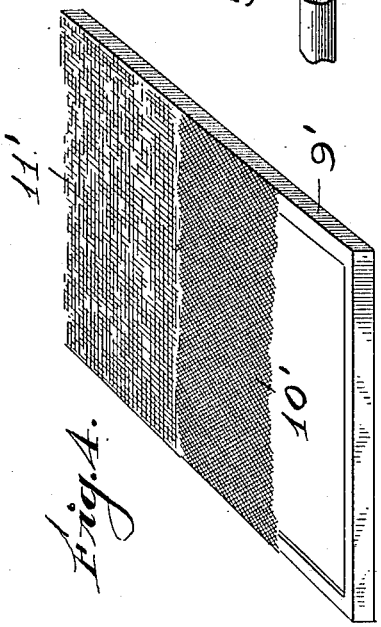
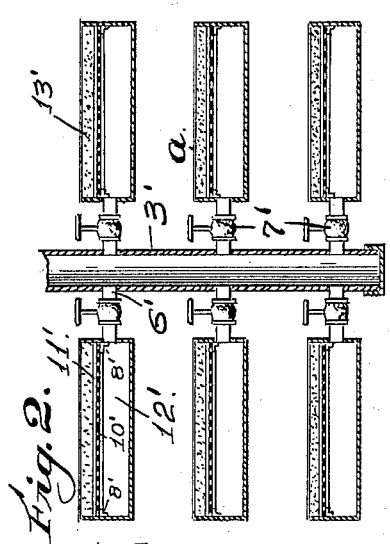

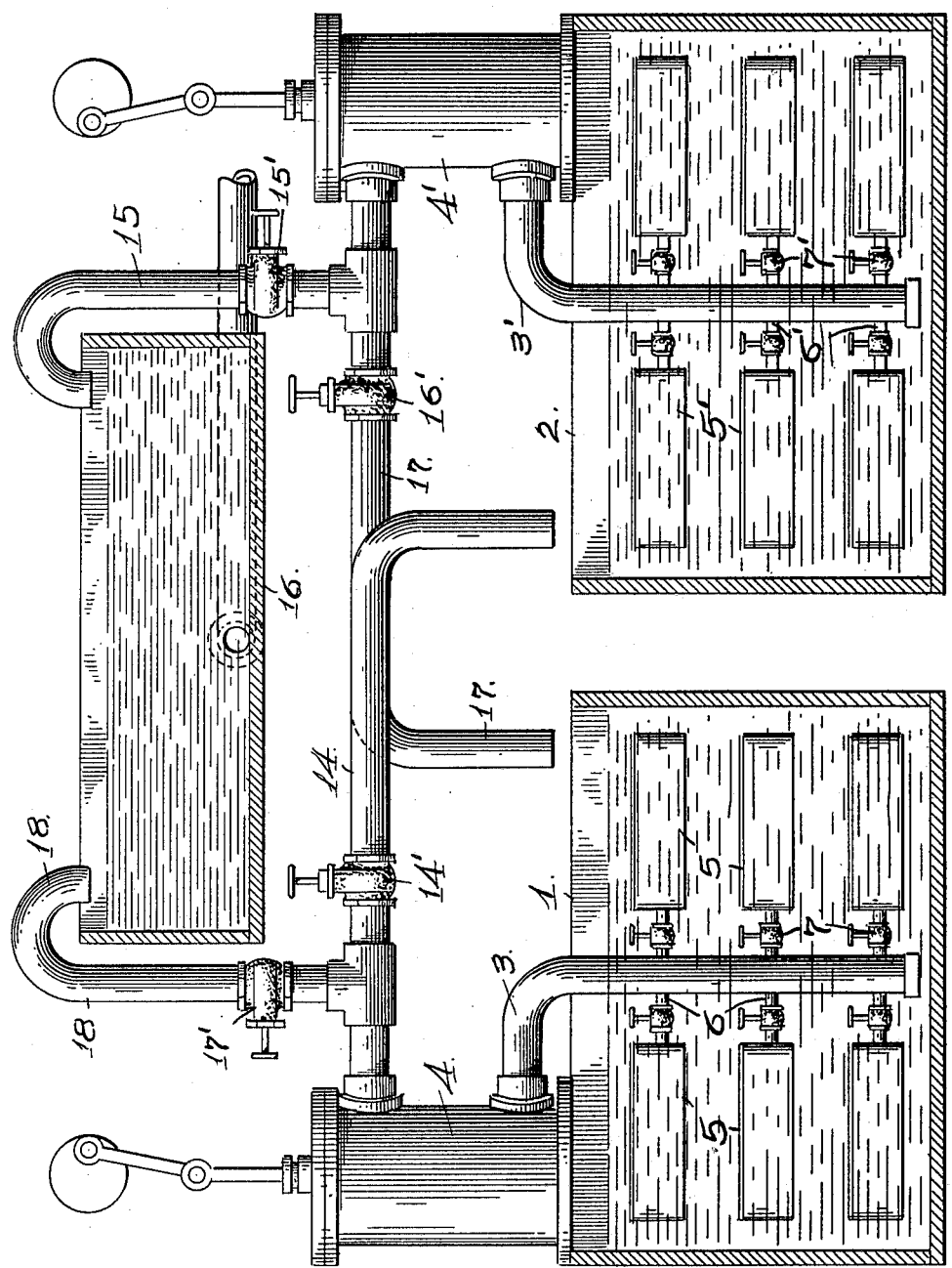

UNITED STATES PATENT OFFICE.

WHITMAN SYMMES, OF VIRGINIA CITY, AND WALTER E. TRENT, OF RENO, NEVADA.

APPARATUS FOR PRECIPITATING VALUE-BEARING SOLUTIONS.

1,048,373.

Specification of Letters Patent.    Patented Dec. 24, 1912.

Application filed November 9, 1911. Serial No. 659,364.

*To all whom it may concern:*

Be it known that we, WHITMAN SYMMES and WALTER E. TRENT, citizens of the United States, residing, respectively, at Virginia City, in the county of Storey, and Reno, in the county of Washoe, State of Nevada, have invented certain new and useful Improvements in Apparatus for Precipitating Value-Bearing Solutions, of which the following is a specification.

The hereinafter described invention relates to an apparatus designed more particularly for the precipitating of cyanid solutions for the recovery therefrom of gold and silver, although the same is equally as well adapted for the recovery of any metal from the cyanid solution; the object of the invention being to precipitate and filter the metal bearing cyanid solution as one operation, and by so doing dispensing with the necessity of the employment of the filter presses at present required for use in the recovery of the values from the precipitated solution.

Ordinarily, the zinc precipitant is either fed or delivered into a flowing body of the cyanid solution or delivered to a body of the solution which is placed in an agitated condition in an endeavor to bring the zinc precipitant in contact with the entire body of the cyanid solution for the precipitation of the gold and silver values contained therein, which so called precipitated solution is then delivered to filter presses for recovering therefrom the precipitated values.

We have discovered that the cyanid solution may be so treated as to precipitate the same and recover the precipitated values as a single operation, thereby avoiding the necessity of resorting to the second treatment at present required to recover the precipitated values from the cyanid solution and by so doing dispensing with the filter presses and avoiding the expense incident thereto, thereby expediting the work of recovering the values from the cyanid solution and materially reducing the expense incident thereto.

Where the precipitant is fed into a flowing body of cyanid solution, or where the solution is maintained in an agitated condition, a considerable quantity of the zinc precipitant fails to be brought into contact with the metal contained within the solution and the same is carried off with the solution into the filter press or presses and accumulates therein as unconsumed or partly consumed precipitant, to such an extent as to require the passing through the filter press or presses a quantity of untreated solution in order to consume such precipitant.

The present invention resides in passing or forcing the cyanid solution through a fixed or stationary bed of zinc dust precipitant, whereby the entire body of the outflowing solution is brought into positive contact with the precipitant and as a continuation of the treatment drawing the precipitated solution through a filtering bed for separating and recovering therefrom the precipitated metal values.

To comprehend the invention reference should be had to the accompanying sheet of drawings, wherein—

Figure 1 is a longitudinal sectional view disclosing the preferred form of the apparatus, wherein is illustrated a plurality of tanks for the reception of the cyanid solution, a suction pipe extended from each, a plurality or series of zinc containing and filtering vacuum trays or pans connected to each of the suction pipes by valved controlled outlet connections, suction means for drawing the solution from within the tanks into the suction pipes through the zinc containing and filtering trays, and connection between the suction means and the tanks for alternately discharging therein the treated solution. Fig. 2 is a vertical sectional view of one of the suction pipes and the vacuum pans or trays connected thereto. Fig. 3 is an enlarged detail view of one of the vacuum pans or trays. Fig. 4 is a perspective view of one of the filtering beds removed from its vacuum pan or tray. Fig. 5 is a longitudinal sectional view illustrating a modification of the vacuum pan or tray.

In the drawings, the numeral 1 is used to designate a tank for the reception of the cyanid solution to be treated, and 2 a companion tank into which the solution withdrawn from tank 1 is delivered for secondary treatment. Any desired number of tanks may be employed for carrying out the invention, but an illustration of a series of two tanks will suffice for an understanding of the invention.

From tank 1 is extended a vertically disposed suction pipe 3, closed at its bottom, which connects outside of the said tank with a suction pump 4. Within the tank 1 is arranged a vertical series of vacuum pans or trays 5, each being connected to the suction pipe 3 by a tubular connection 6, the flow through each pan or tray into the suction pipe 3 being regulated by a controlling valve 7 situated within the connection 6. Each vacuum pan or tray is open at its top, and within the same is held a distance from its bottom by a supporting ledge 8 a removable frame 9. This frame is covered by a layer of fine mesh screen or wire 10, over which in turn is secured a layer 11 of felt or other filtering material. When the frame with its screen and filtering covering is fitted within the pan or tray 5, there is formed below the same a vacuum chamber 12, from which extends the valve controlled connection 6. The filter frame is situated about two or three inches, more or less, from the upper edge of the vacuum pan or tray 5, and on the same is placed a layer of zinc dust to form a precipitating bed 13, through which the cyanid solution is drawn from the tank 1 into the vacuum chamber 12.

The cyanid solution enters the tank 1, or the first tank of the series of tanks until the uppermost pan or tray of the filled series of pans or trays is submerged, when, the valves 7 of the connections 6 being opened, the pump 4 is placed into action, the suction of which draws the solution from within the tank 1 through the bed 13 of zinc dust and the filtering layer 11 into the vacuum chamber 12 of the pans or trays 5, from which it is drawn through the connections 6 into the suction pipe 3 and to the pump 4, the treated solution discharging from said pump being conveyed by the pipe, runway or conduit 14 and delivered into the tank 2. As the cyanid solution must in leaving the tank 1 pass through the body or bed of zinc dust, the same is brought into perfect contact with the precipitant and all metal values contained therein precipitated which values are recovered or removed from the treated solution as the same is drawn through the filtering layer 11 into the vacuum chamber 12, so that the solution passes into the suction pump 4 as filtered liquid.

Owing to the possibility that the body of precipitant contained within the first series of pans or trays may not be sufficient to precipitate all the values in solution contained in the cyanid solution drawn into the pump 4, the same is delivered into a second tank 2 for further treatment. Like tank 1, there is arranged in tank 2 a suction pipe 3', closed at its bottom, with which a series of vacuum pans or trays 5' are connected by means of the outlet connections 6', the flow therethrough being regulated by the controlling valves 7'. In each of these pans or trays is held by a supporting ledge 8' a frame 9', provided with a fine mesh screen or wire covering 10', which supports a layer 11' of felt or other filtering medium. The valve controlled outlet 6' of each pan or tray 5' extends from the vacuum chamber 12' thereof, and the solution is withdrawn from the tank 2 through the precipitating and filtering vacuum pans or trays 5' by means of the suction pump 4', with which the pipe 3' connects outside of the tank 2, the solution withdrawn from the said tank being discharged by the pump 4' through the pipe 15 into a collecting reservoir 16 for future use as a filtered liquid.

The treatment of the solution withdrawn from the tank 2 is the same as that which takes place as removed from tank 1, that is, as the solution is drawn through and into contact with the bed 13' of zinc dust precipitant held within each of the pans or trays 5' the metal values which may be contained therein are precipitated and the precipitated solution then drawn through the filtering cloth or layer 11' into the vacuum chamber 12', from which it is withdrawn as filtered liquid.

The solution contained or delivered into the tank 2 will not be rich in values, due to the previous treatment thereof, consequently, the zinc dust precipitant contained within the pans or trays 5' will be only partially consumed and the same may be wholly consumed by diverting the feed of the cyanid solution into tank 2 while a clean up is being made from tank 1 and the consumed zinc dust precipitant of the pans or trays 5 is being replenished. The solution will then be withdrawn from tank 2 and discharged as treated liquid into tank 1, in which case the valve 15' of pipe 15 is closed and the valve 16' of pipe 17 leading from the suction pump 4' to the tank 1 is opened, while the valve 14' of pipe or conduit 14 is closed and the valve 17' of pipe 18 leading from pump 4 is opened for the discharge of the treated liquid from pump 4 into the reservoir 16. In this manner the delay which otherwise would be occasioned during the making of a clean up is avoided, likewise the removal of the unconsumed zinc dust precipitant.

As the level of the solution within either of the tanks, say within the tank 1, during its removal falls below the upper pans or trays 5 of the series of vacuum pans or trays, the valve 7 of the connection 6 leading to the suction pipe 3 is closed, permitting the collected values to be removed from said pan or tray and a fresh bed of zinc dust placed therein, such collecting and re-filling operation taking place as each of the pans or trays become exposed, due to the withdrawal of the solution from within the tank.

In Fig. 5 of the drawings is illustrated a modified form of the vacuum pans or trays, in which case two frames 9 are provided, one held a slight distance above the other within the pan or tray, each being provided with a mesh screen covering 10 and a filtering layer 11. In this case two beds 13 of zinc dust are provided for each vacuum pan or tray, which permits of the withdrawn solution being subjected to an increased area of the precipitant, thereby insuring a thorough precipitation of the metal values as the solution is drawn from within the tank.

If so desired, the zinc dust may be confined within the vacuum pan or tray by placing thereover a fine covering $a$ of cloth or wire, so as to provide against displacement of the zinc dust and to hold the same securely in place within the vacuum pan or tray.

The quantity of zinc dust to each pan or tray may be varied as deemed advisable, in accordance with the solution to be treated and to insure the complete consumption thereof during the flow of the solution through the vacuum pans or trays, so that the quantity of unprecipitated values carried off by the solution may be reduced to a minimum.

It will be understood that the area of the vacuum pans or trays may be varied as desired for enlarging the bed of zinc dust precipitant and the area of the filtering medium varied accordingly, but for practical use a series of comparatively small sized vacuum pans or trays are deemed advisable and preference is given to such construction and disposition of the precipitating and filtering means, due mainly to the ease in the handling thereof.

By the use of the described invention the entire body of the cyanid solution passing from the receiving tank is brought into positive contact with the zinc dust precipitant, which does not result where the precipitant is fed into the solution during the flow thereof, nor is such result obtained where the zinc dust is delivered to the solution confined within a tank and subjected to agitation. In such mentioned cases a considerable quantity of the precious metal is carried off in the solution and necessitates the recovery thereof in the filter presses by the unconsumed precipitant collected therein, for if not precipitated in the filter presses or by other means the said values go to waste.

The described apparatus gives perfect contact of all outflowing or withdrawn cyanid solution with the precipitant, the time contact of which may be varied as desired by increasing or decreasing the bed of zinc dust as well as the flow of the solution. The solution as passed through a stationary bed of precipitant insures perfect consumption thereof, while the precipitated solution is filtered for the recovery of the values during the withdrawal of the treated solution. By this means the precipitant is not carried off in an unconsumed condition, all values are recovered from the outflowing solution, and the use of filter presses and the cost and expense incident to the operation of the same avoided.

We are aware that changes may be made in the construction and arrangement of the working parts herein shown and described without creating a departure from the invention, and we do not wish to be understood as confining ourselves to the construction shown and described, but wish to be understood as claiming broadly the precipitating of cyanid solution by forcing the same through a stationary bed of zinc precipitant, also the forcing of the said solution through a stationary bed of zinc precipitant and without an interruption in the flow drawing the precipitated solution through a filtering surface to recover therefrom the precipitated values.

While we have described the employment of two receiving tanks for the treatment of the cyanid solution and a series of vacuum pans or trays in each, it is obvious that a single tank provided with a series of stationary vacuum pans or trays or a single pan or tray of suitable size may be employed, and equally so that any form of finely divided precipitant may be employed instead of zinc dust, the essential requirement being that the solution to be treated be passed through a confined bed of precipitant, and further that the precipitated solution be passed without an interruption in its flow through a filtering medium to recover therefrom the precipitated values.

By the expression receiving tanks as herein employed is meant any form of a receptacle or conduit for receiving the cyanid solution to be treated, and the vacuum pans or trays containing the fixed bed of precipitant and the layer of filtering material constitutes the outlet therefor though which the entire body of solution must pass in order to escape from the receiving receptacle, which said pan or tray serves as a holder or container for the bed of precipitant and filtering material, and the form thereof may be varied as desired in accordance with the receiver for the solution to be treated.

Having thus described the invention what is claimed as new and desired to be protected by Letters Patent is—

1. An apparatus for the precipitation of cyanid solution for the recovery of metal values therefrom, the same comprising a receiving vessel for the solution, a suction pipe extended therefrom, a vacuum pan or tray containing a filtering medium and a fixed bed of precipitant arranged in advance of the filtering medium, connection between the vacuum pan and the suction pipe, and means connected to the suction pipe for drawing the solution from the receiving vessel through the fixed bed of precipitant within the vacuum pan.

2. An apparatus for precipitating cyanid solutions for the recovery of the metal values therefrom, the same comprising a receiving vessel, a filtering medium within said vessel, a fixed bed of precipitant held therein in advance of the filtering medium, and means for expelling the solution from within the vessel through the said bed of precipitant.

3. In an apparatus for precipitating cyanid solutions for the recovery of metal values therefrom, the same comprising a receiving vessel for the solution to be treated, a suction pipe extended therein, a series of vacuum pans connected therewith, a layer of filtering material held within each pan, a bed of precipitant located in advance of and supported by said filtering layer, and means for withdrawing the solution from the vessel by passing the same first through the bed of precipitant to precipitate the solution and then through the filtering layer to separate and recover the values from the precipitated solution.

4. In an apparatus for precipitating cyanid solutions for the recovery of metal values therefrom, the same comprising a plurality of receiving vessels for alternately receiving solution to be treated, a suction pipe extended within each vessel, a vacuum pan connected to each suction pipe, a layer of filtering material secured in each of said pans, a bed of precipitant located in advance of said filtering material and supported by the said layers of filtering material, means connected with the suction pipes for withdrawing the solution from the receiving vessels by first passing the same through the bed of precipitant and the layer of filtering material, and thence through devices for passing the withdrawn precipitated solution from one vessel to the other.

In testimony whereof we have signed our names to this specification in the presence of two subscribing witnesses.

WHITMAN SYMMES.
WALTER E. TRENT.

Witnesses:
Geo. D. Smith,
H. R. Norsworthy.

---

Copies of this patent may be obtained for five cents each, by addressing the "Commissioner of Patents, Washington, D. C."